(12) United States Patent
Hsia et al.

(10) Patent No.: US 9,761,262 B2
(45) Date of Patent: Sep. 12, 2017

(54) PLANARIZATION METHODOLOGY FOR TOPOGRAPHICALLY CHALLENGED MEDIA SURFACE

(75) Inventors: Yiao-Tee Hsia, Pleasanton, CA (US); Lei Li, Wexford, PA (US)

(73) Assignee: Seagate Technology LLC, Cupertino, CA (US)

( * ) Notice: Subject to any disclaimer, the term of this patent is extended or adjusted under 35 U.S.C. 154(b) by 1311 days.

(21) Appl. No.: 12/167,040

(22) Filed: Jul. 2, 2008

(65) Prior Publication Data

US 2010/0002329 A1    Jan. 7, 2010

(51) Int. Cl.
| | | |
|---|---|---|
| G11B 5/74 | (2006.01) | |
| G11B 5/82 | (2006.01) | |
| B82Y 10/00 | (2011.01) | |
| G11B 5/725 | (2006.01) | |
| G11B 5/84 | (2006.01) | |
| G11B 5/855 | (2006.01) | |

(52) U.S. Cl.
CPC ............... *G11B 5/82* (2013.01); *B82Y 10/00* (2013.01); *G11B 5/725* (2013.01); *G11B 5/743* (2013.01); *G11B 5/8408* (2013.01); *G11B 5/855* (2013.01)

(58) Field of Classification Search
USPC ............... 427/127–131; 369/275.4, 277, 286
See application file for complete search history.

(56) References Cited

U.S. PATENT DOCUMENTS

| | | | |
|---|---|---|---|
| 5,030,478 A * | 7/1991 | Lin et al. | 427/558 |
| 6,555,197 B1 * | 4/2003 | Ishida et al. | 428/65.8 |
| 7,019,924 B2 | 3/2006 | McNeil et al. | |
| 7,147,790 B2 | 12/2006 | Wachenschwanz et al. | |
| 7,153,597 B2 | 12/2006 | Yang et al. | |
| 2002/0160106 A1 * | 10/2002 | Isozaki | 427/128 |
| 2005/0069732 A1 * | 3/2005 | Kamata et al. | 428/694 TC |
| 2005/0271819 A1 * | 12/2005 | Wago et al. | 427/259 |
| 2006/0078681 A1 * | 4/2006 | Hieda et al. | 427/307 |
| 2006/0099461 A1 | 5/2006 | Jones et al. | |
| 2006/0105203 A1 | 5/2006 | Li et al. | |
| 2006/0222904 A1 | 10/2006 | Hsia et al. | |
| 2006/0257694 A1 * | 11/2006 | Hieda et al. | 428/826 |
| 2007/0190365 A1 * | 8/2007 | Kodama et al. | 428/832 |
| 2007/0275270 A1 * | 11/2007 | Hattori et al. | 428/833 |
| 2008/0085362 A1 | 4/2008 | Yen et al. | |
| 2008/0143020 A1 * | 6/2008 | Ichikawa et al. | 264/293 |

OTHER PUBLICATIONS

Merriam-Webster Dictionary.com "Definition of Bond" <http://www.merriam-webster.com/dictionary/bond> accessed on Jul. 1, 2013.*

* cited by examiner

*Primary Examiner* — Mandy Louie (57) ABSTRACT

The present invention relates to a device for magnetic recording that includes a storage medium having a media surface. The media surface has a plurality of lands and recesses between the lands. A polymer layer fills the recesses so that the media surface is substantially planar.

18 Claims, 6 Drawing Sheets

PLANARIZATION METHODOLOGY FOR TOPOGRAPHICALLY CHALLENGED MEDIA SURFACE

BACKGROUND

Traditional magnetic storage media, such as those employed in disc drives, are essentially uniform and continuous. The density with which data can be written is constrained by the superparamagnetic limit. A solution to overcoming the constraints of the superparamagnetic limit is to organize the magnetic media into a series of individual lands to create patterned media, such as bit-patterned media (BPM) and discrete track media (DTM). A benefit of this structure is the increase in areal density that can be achieved over traditional media. Patterned media use a technology that promises to extend the recording density of magnetic media.

However, one of the drawbacks of this structure is the residual topography on the media surface. When a disc head slider flies over the topographically challenged media surface, the disc head slider experiences a dynamic response to the topography. This problem is particularly relevant when the disc head slider has to fly over media surfaces with varying topography such as between data zones and with servo patterns. Additionally, the problem is compounded when the disc head slider has a skew angle (i.e. when the central longitudinal axis of the disc head slider and the tangential line at the disc head slider center are not aligned).

SUMMARY

In one aspect, the present invention relates a method of fabricating a patterned storage medium. The method includes providing a storage medium having land surfaces and recess surfaces, coating the storage medium with a polymer, and selectively removing the polymer to form a substantially planar surface. The polymer preferentially bonds to the recess surfaces.

In another aspect, the present invention relates to a device for magnetic recording that includes a storage medium having a media surface, a plurality of lands on the media surface, and recesses between the lands. A polymer layer fills the recesses so that the media surface is substantially planar.

DETAILED DESCRIPTION

Figure 1:
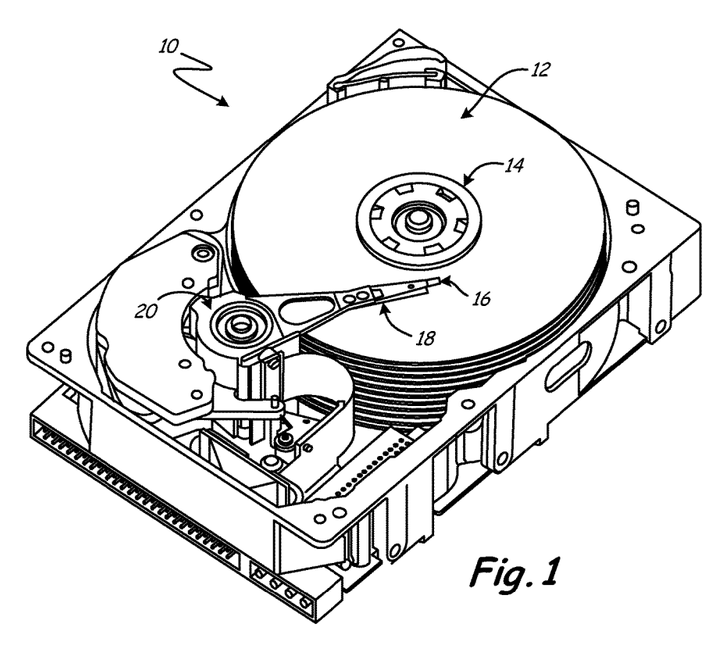
FIG. 1 is a perspective view of a disc drive system.

FIG. 1 is a perspective view of a disc drive 10 in which embodiments of the present invention may be employed. Disc drive 10 includes disc pack 12, spindle 14, disc head slider 16, actuator 18, and voice coil motor 20. Disc pack 12 includes one or more individual discs that are rotated about a central axis by spindle 14. The individual discs are patterned media such as bit-pattern media or discrete track media that have lands and recesses. The lands may be of any size or shape. For example, the lands may be arcs or rings, or may have a circular or rectangular cross-section. The lands on a given media may not be uniform in shape and size, thus forming servo patterns. In one example, the individual discs are fabricated using a planarization process described below that creates substantially planar or level surfaces on the discs.

Data is written to and read from the individual discs by disc head slider 16. Disc head slider 16 is positioned over individual tracks of each disc by actuator 18 and voice coil motor 20. In this way, as spindle 14 rotates the discs, voice coil motor 20 and actuator 18 position the disc head slider 16 over a desired track, such that data can be written to or read from the disc.

Disc head slider 16 flies on top of the individual disks based on the pressurization of the air underneath disc head slider 16. As disc head slider 16 flies over the surface of the media, it senses the lands and recesses based on pressure. The pressure difference due to the recesses affects disc head slider 16 in a manner similar to how rumble strips in a road affects a car. That is, disc head slider 16 actually feels the difference in topography and experiences a dynamic response to the recesses.

Figure 2:
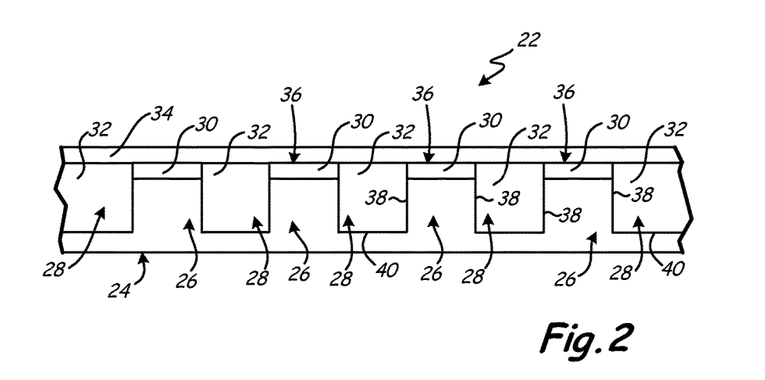
FIG. 2 is a schematic of a patterned media having a diamond-like carbon (DLC) layer that has been fabricated with a planarization process.

FIG. 2 is a schematic diagram of planarized patterned media 22. Planarized patterned media 22 has been processed to create a substantially planar (i.e. level) surface. Planarized patterned media 22 includes patterned media 24 (having lands 26 and recesses 28), diamond-like carbon (DLC) layer 30, polymer 32 and lubricant 34. Although lands 26 are shown as being identical in size and shape, lands 26 may have different shapes and sizes. For example, lands 26 may be part of a servo pattern. Additionally, lands 26 may be any shape, such as arcs or rings, or may have a circular or rectangular cross-section.

Patterned media 24 has lands 26 (having land surfaces 36 and land sides 38) and recesses 28 (having recess surfaces 40) arranged in an alternating pattern. In one example, the distance between land surfaces 36 and recess surfaces 40 is about several to tens of nanometers. This distance differential affects the flying dynamics of disc head slider 16, as it flies over patterned media 24 in use in disc pack 12.

Land surfaces 36 of patterned media 24 may contain diamond-like carbon (DLC) layer 30. DLC layer 30 provides oxidation and corrosion resistance to land surfaces 36. Diamond-like carbon layer 30 has a high hardness, a high wear resistance, a low coefficient of friction and is chemically inert.

Polymer 32 bonds to recess surfaces 40. Polymer 32 fills in recesses 28, and creates a substantially planar surface on patterned media 24. This substantially planar surface on media 24 improves the flying dynamics of disc head slider 16.

Lubricant 34 is applied over polymer 32 and DLC layer 30. Lubricant 34 minimizes the wear of planarized patterned media 22. Lubricant 34 may also absorb a small amount of impact energy in the event of disc head slider 16 making contact with planarized patterned media 22 (known as head-disc impact). Additionally, in the event of a head-disc impact, lubricant 34 may be self-healing by flowing into the area where lubricant 34 was disturbed and replacing the missing lubricant.

Figure 3A:
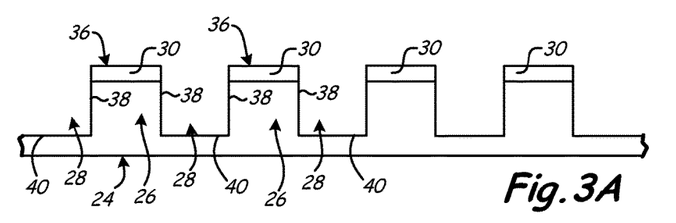
FIGS. 3A-3C are diagrams illustrating the planarization process of the patterned media having a DLC layer.
Figure 3B:
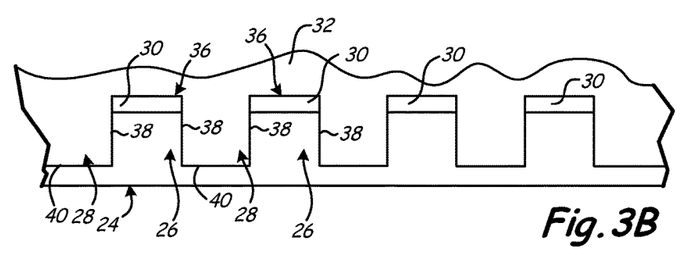
Figure 3C:
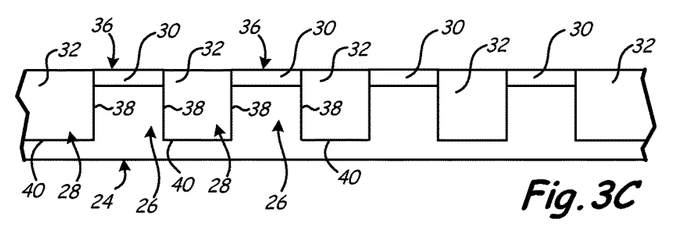

FIGS. 3A-3C illustrate the steps performed in the planarization process. The planarization process creates a substantially planar (i.e. level) surface on patterned media such as bit-patterned media and discrete track media. In FIG. 3A, patterned media 24 is selected to which the planarization process will be applied. Patterned media 24 includes a plurality of lands 26 (having land surfaces 36 and land sides 38) that extend from the surface of media 24. In one example, each individual land 26 is one bit. In another example, lands 26 are concentric rings. In a further example, lands 26 are islands.

Lands 26 may be imprinted or can be grown on media 24. For example, magnetic material may be grown on top of a pre-stamped substrate to form lands 26. The areas of media 24 not containing lands 26 contain recesses 28 having recess surfaces 40. Recesses 28 may be several to tens of nanometers deep.

Land surfaces 36 and recess surfaces 40 must contain different materials. The materials used for land surfaces 36 and recess surfaces 40 should not be detrimental to each other. That is, although the materials are not the same, they should not adversely affect each other. In one example, land surfaces 36 and recess surfaces 40 contain different magnetic materials. In another example, a coating is applied to land surfaces 36 so that land surfaces 36 include a different material than recess surfaces 40.

In FIGS. 2-3C, land surfaces 36 have DLC layer 30 so that land surfaces 36 include a different material than recess surfaces 40. In one example, media 24 may be created by etching a media disc already containing a DLC layer. In this example, land surfaces 36 contain DLC layer 30 while recess surfaces 40 and land sides 38 do not. In another example, media 24 is imprinted and DLC layer 30 is applied to land surfaces 36.

As shown in FIG. 3B, after patterned media 24 is created or selected, polymer 32 is applied to the surface of patterned media 24. Polymer 32 is applied over land surfaces 36 and recess surfaces 40. Polymer 32 contains polar groups. The functionalized end groups of polymer 32 facilitate preferential bonding. The first end of polymer 32 is tailored to preferentially bond to recess surfaces 40. The second end of polymer 32 is tailored to preferentially bond to lubricant layer 34.

As explained above, land surfaces 36 and recess surfaces 40 include different materials. Therefore, the first end of polymer 32 may be tailored to bond to recess surfaces 40 while not bonding or only weakly bonding to land surfaces 36. If recess surfaces 40 contain the same materials as land sides 38, the first end of the polymer 32 may also bond to land sides 38. For example, land surfaces 36 may contain DLC layer 30 while land sides 38 and recess surfaces 40 do not.

Polymer 32 is a semi-solid. If polymer 32 does not bond to a surface of media 24, it will flow off media 24 when it is tilted. However, when bonded to a surface, polymer 32 adheres to the surface and behaves as a solid.

Polymer 32 should be selected so that it does not interfere with the magnetic performance of media 24. In one example, polymer 32 contains self-assembled mono-layers (SAMs). Two common examples of SAMs chemistries are tridecafluoro-tetrahydrooctyl-trichlorosilane (FOTS) and heptadecafluoro-tetrahydrodecyl-trichlorosilane (FDTS).

In another example, polymer 32 includes substituted polyolefin (such as polyacrylates), epoxy, polyurethane or polyethers. In a further example, polymer 32 is formed by applying a liquid precursor system to media 24 and curing. The liquid precursor system contains at least one liquid monomer. The liquid monomer may be used alone or in combination with one or both of an initiator and a carrier (solvent) system. The initiator is a liquid or a solid that is soluble in the liquid monomer(s). The liquid precursor system may be applied to the surface of media 24 with or without the carrier (solvent) system. If the carrier system is used, the liquid precursor system may be applied by dip-coating media 24. If the carrier system is not used, the liquid precursor system may be applied by dip-coating or by applying the liquid precursor system as a vapor. When the liquid precursor system is applied as a vapor, a more uniform coating is applied to media 24 because meniscus forces do not prevent the precursor system from coating some areas of media 24.

Following application, the liquid precursor is cured using UV curing, photo-initiated (i.e. visible light) polymerization, thermal curing and irradiation methods (i.e. E-beam). Curing polymerizes and solidifies the liquid precursor to form polymer 32.

As discussed above, the liquid precursor may be cured using an UV curing system. In one example, the liquid monomer is $[(CH_2=CHCOO)mROOCC_2H_4]S$, and the initiator is a liquid UV initiator containing mixtures of benzene derivatives chemically prepared from the group consisting of technical amyl alcohols and technical isoamyl alcohols. In another example, the liquid monomer is either $[CH_2=CH(CN)]$ (acrylonitrile) or $[CH_2=CH(COOCH_3)]$ (vinyl acetate), and no UV initiator is used.

The liquid precursor may also be cured using thermal curing. In one example, the liquid monomer is $[CH_2=C(CH_3)COOCH_3]$ (methyl methacrylate), and the initiator is either $[(CH_3)_2C(CN)N]_2$ (2,2'-azobisisobutyronitrile) or $(C_6H_5COO)_2$ (benzoyl peroxide). After application, media 24 is heated between about 40° C. to about 100° C. for about 30 minutes to about 120 minutes to cure the liquid precursor system. In another example, the liquid monomer is $[CH_2=CH(C_6H_5)]$ (styrene), and no initiator is needed. In this example, after application, media 24 is heated between about 100° C. and about 167° C. for about 30 to about 120 minutes to cure the liquid precursor system.

As shown in FIG. 3C, after polymer 32 is applied, media 24 is lightly wiped, such as by buffing or tape polishing, to remove polymer 32 from land surfaces 36. Polymer 32 is tailored to strongly bond to recess surfaces 40 while only weakly bond to land surfaces 36. A gentle wiping of the surface of media 24 removes polymer 32 from land surfaces 36 while polymer 32 remains on recess surfaces 40, creating a surface in recesses 28 that is substantially coplanar with land surfaces 36. Thus, wiping levels the surface of media 24. As shown in FIG. 3C, land surfaces 36 include DLC layer 30, and the wiping of media 24 does not remove DLC layer 30. It should be noted that after wiping, a layer of polymer 32 about 1 nm or less in thickness may remain on land surfaces 36. These thin layers do not significantly affect the flying dynamics of disc head slider 16, and are considered insignificant.

Finally, as shown in FIG. 2, lubricant 34 is applied to the surface of media 24. Lubricant 34 protects media 24 from corrosion. In one example, lubricant 34 is a perfluorinated polyether (PFPE) type of lubricant commonly used in the hard disc drive industry. Lubricant 34 is applied as a thin layer over the surface of media 24. In one example, lubricant 34 is dip coated to the desired thickness. In another example, lubricant 34 is vapor deposited to form the desired thickness.

As mentioned above, the second end of polymer 32 is tailored to preferentially bond to lubricant 34. Polymer 32 must be tailored to attract lubricant 34. Otherwise, lubricant 34 will not bond with polymer 32. In one example, polymer 32 is a SAM and lubricant 34 is PFPE.

Although FIGS. 2-3C describe media 24 as including DLC layer 30, there are many other methods of forming media 24 wherein a layer on land surfaces 36 creates different properties on land surfaces 36 and recess surfaces 40 so that polymer 32 may be tailored to preferentially bond to recess surfaces 40 and land sides 38 but not to land surfaces 36. In one example, land surfaces 36 are treated with an antiwetting compound so that the properties of land surfaces 36 and recess surfaces 40 are different. In a further example, land surfaces 36 and recess surfaces 40 have a DLC layer, and an antiwetting compound is applied to land surfaces 36 so that the properties of land surfaces 36 and recess surfaces 40 are different.

Figure 4:
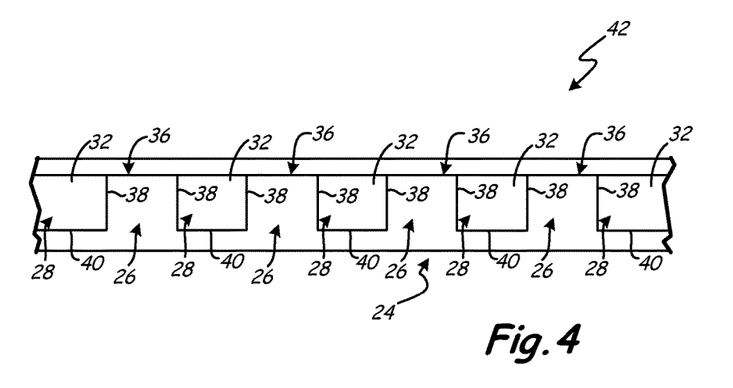
FIG. 4 is a schematic of a planarized surface patterned media without a DLC layer that has been fabricated with the planarization process.
Figure 5A:
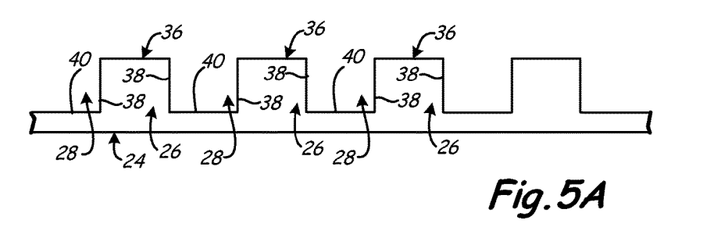
FIGS. 5A-5C are diagrams illustrating the planarization process of the patterned media without a DLC layer.
Figure 5B:
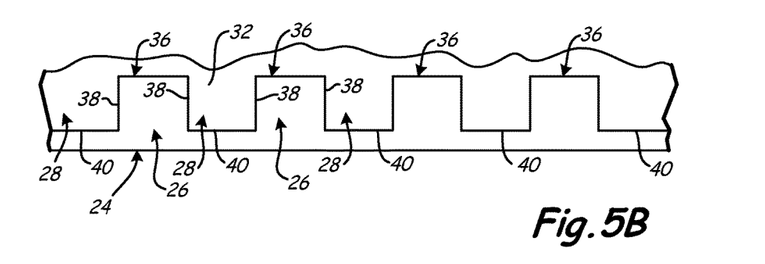
Figure 5C:
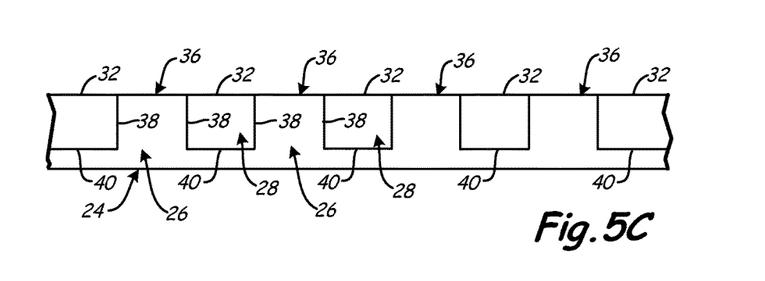

As shown in FIG. 4, the planarization process may also be applied to patterned media 24 not having DLC layer 30 on land surfaces 36. Planarized patterned media 36 includes patterned media 24 (having lands 26 and recesses 28), polymer 32 and lubricant 34. As shown in FIGS. 5A-5C, the process for planarized patterned media 36 is similar to the process for planarized patterned media 22, however, media 24 does not include DLC layer 30.

First, as shown in FIG. 5A, patterned media 24 is selected. Patterned media 24 has lands 26 (having land surfaces 36 and land sides 38) and recesses 28 (having recess surfaces 40). In one example, patterned media 24 is bit-pattern media having islands and grooves. In another example, patterned media 24 is discrete track media having a plurality of concentric rings and grooves.

Land surfaces 36 and recess surfaces 40 include different materials that are not detrimental to each other. In one example, adhesion layers containing a magnetic material different than the magnetic material on land surfaces 36 are placed on recess surfaces 40. In another example, recesses 28 are etched into a media disc containing two different magnetic materials layered on top of one another. The bottom layer is stop layer and forms recess surfaces 40. The top layer is above the stop layer and forms land surfaces 36 and land sides 38.

Next, as shown in FIG. 5B, polymer 32 is applied over the surface of media 24 so that polymer 32 is applied to land surfaces 36 and recess surfaces 40. As explained above, polymer 32 is tailored so that the first end of polymer 32 preferentially bonds to recess surfaces 40 and the second end of polymer 32 preferentially bonds to lubricant 34. Polymer 32 may be applied as a liquid or as a vapor and then cured to form polymer 32. In contrast to the examples in FIGS. 2-3C, where land surfaces 36 and land sides 38 included different materials, land surfaces 36 and land sides 38 may be the same material. In this case, the first end of polymer 32 bonds to recess surfaces 40 but not to land surfaces 36 and land sides 38.

After polymer 32 has been applied, the surface of media 24 is lightly wiped, such as by buffing or tape polishing. Because polymer 32 is tailored to only bond to recess surfaces 40 and lubricant 34, and because recess surfaces 40 and land surfaces 36 contain different materials, polymer 32 does not bond or only weakly bonds to land surfaces 36, and is easily removed when wiped. After wiping, polymer 32 fills in recesses 28 so that polymer 32 and land surfaces 36 are coplanar and media 24 has a substantially planar surface as shown in FIG. 5C.

Finally, as illustrated in FIG. 4, a thin coating of lubricant 34 is applied to land surfaces 36 and polymer 32. As described above, lubricant 34 is a thin film which may be applied by dip coating. Polymer 32 is tailored to bond to lubricant 34. Additionally, polymer 32 should be chosen so that polymer 32 does not have a detrimental effect on lubricant 34. For example, polymer 32 should not degrade lubricant 34 as alumina degrades PFPE lubricants via Lewis acid degradation mechanism.

Figure 6:
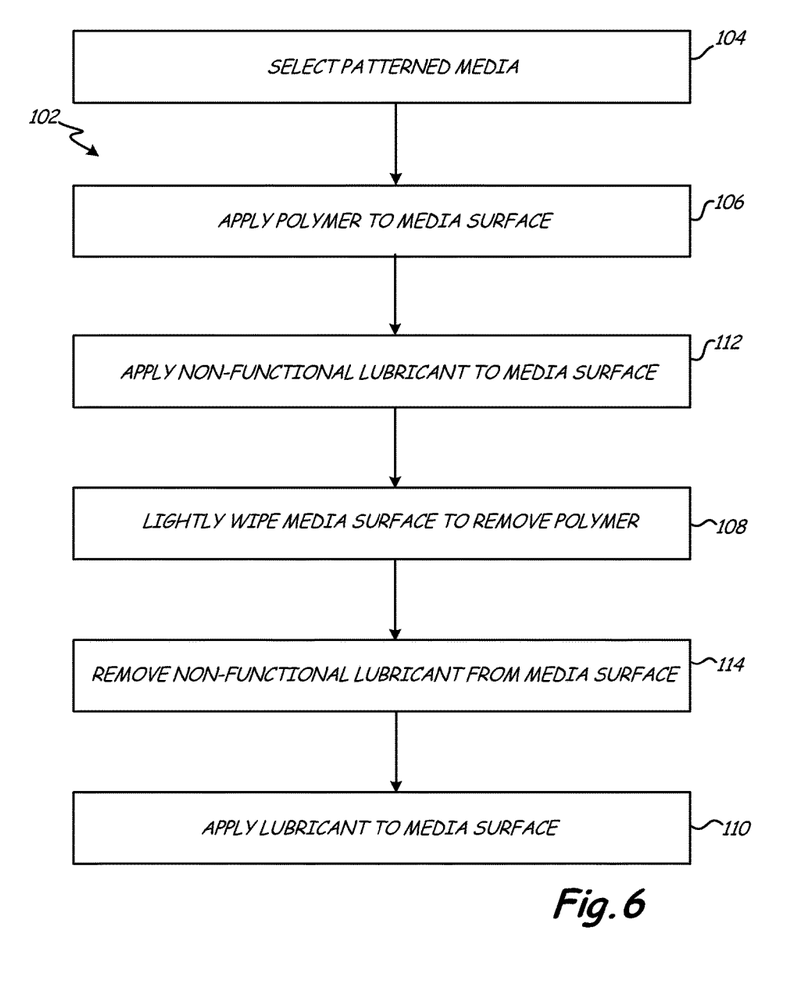
FIG. 6 is a block diagram illustrating the planarization process.

In summary, as shown in FIG. 6, planarization process 102 includes selection of the patterned media (step 104), application of a tailored polymer to the media (step 106), light wiping of the patterned media to remove the polymer (step 108), and application of a lubricant to the media surface (110).

Optionally, a non-functional lubricant may be applied to the media (step 112) before the media is wiped in step 106. The non-functional lubricant mitigates scratching the surface of the media during wiping. In one example, the non-functional lubricant is a poly(tetrafluoroethylene oxide-co-difluoromethylene oxide) such as Z03 and Z25. In another example, the non-functional lubricant is a poly (perfluoropropyl oxide) such as demnum.

If non-functional lubricant is applied to the media (step 112), after wiping the media to remove the polymer (step 108), the non-functional lubricant is removed from the media (step 114). After wiping, the non-functional lubricant may remain on some portions of the media. Therefore, the media is washed or degreased with a solvent to remove any non-functional lubricant remaining on the media. In one example, the solvent is any solvent commonly used in the hard disc media industry to remove non-functional lubricants from media surfaces. In another example, the solvent is 2,3-dihydrodecafluoropentane (such as Vetrel XF). In a further example, the solvent is ethyl nonafluoroisobutyl ether (such as HFE 7200).

Planarization process 102 creates a substantially planar (i.e. level) surface on patterned media 24, thus allowing disc head slider 16 to fly over the media without being significantly affected by the topography of the surface of the media. The surface of media 24 is buffed so that polymer 32 on recess surfaces 40 are substantially coplanar with land surfaces 36. Therefore, disc head slider 16 will experience less dynamic response when flying over the planar patterned media 22, 36.

Planarization process 102 only requires a light wiping (such as buffing or tape polishing) to remove overfill material from land surfaces 36 because polymer 32 is tailored to preferentially bond to recess surfaces 40. Moreover, the wiping step will not remove the carbon overcoat or DLC layer 30, if present. In contrast, lapping processes require large lapping machines to physically remove overfill material and make the surface of the media coplanar again. Lapping processes remove any material on the surface of the media coplanar, including carbon overcoat layers such as DLC layers. Planarization process 102 is simpler and costs less than a lapping process, and selectively removes overfill polymer material.

Wiping also removes more polymer 32 from land surfaces 36 than lapping processes. Any polymer 32 left on land surfaces 36 is a spacing loss. Therefore, the more polymer 32 that is removed from land surfaces 36, the higher the recording density of media 24.

Although the present invention has been described with reference to preferred embodiments, workers skilled in the art will recognize that changes may be made in form and detail without departing from the spirit and scope of the invention.

The invention claimed is:
1. A method comprising:
coating a storage medium with a polymer, wherein the storage medium comprises land sides, land surfaces comprising a first material and recess surfaces comprising a second material, and the first material and the second material are different; and removing the polymer from the land surfaces to form a substantially planar surface on the storage medium, wherein the polymer comprises a functionalized end group at a first end that is operable to preferentially bond to the recess surfaces and the land sides.

2. The method of claim 1, wherein the polymer on the recess surfaces is substantially coplanar with the land surfaces.

3. The method of claim 2, wherein the removing the polymer from the land surfaces to form a substantially planar surface on the storage medium comprises:

wiping the storage medium to remove the polymer from the land surfaces.

4. The method of claim 1, further comprising:

applying a lubricant layer on the substantially planar surface of the storage medium, wherein the polymer has a second end that preferentially bonds to the lubricant layer.

5. The method of claim 1, wherein the polymer is selected from a group consisting of substituted polyolefins, polyacrylates, epoxies, polyurethanes, polyethers, self-assembled monolayers (SAMs), and combinations thereof.

6. The method of claim 1, wherein the polymer is formed from a liquid precursor selected from a group consisting of acrylonitrile, vinyl acetate, methyl methacrylate, and styrene.

7. The method of claim 1, wherein the coating the storage medium comprises:

applying a liquid precursor to the storage medium, wherein the applying the liquid precursor comprises at least one selected from a group consisting of applying a vapor to the storage medium and applying a liquid to the storage medium; and curing the liquid precursor to form the polymer, wherein the curing the liquid precursor comprises at least one selected from a group consisting of UV curing, photo-initiated polymerization, thermal curing, and E-beam irradiation.

8. The method of claim 1, wherein each of the first material and the second material comprise a magnetic material.

9. The method of claim 1, wherein the land surfaces comprise a diamond-like carbon layer.

10. The method of claim 1, wherein the land surfaces comprise an antiwetting compound.

11. The method of claim 1, further comprising:

applying a lubricant to the storage medium prior to removing the polymer from the land surfaces, wherein the lubricant mitigates scratching the surface of the storage medium during removing the polymer from the land surfaces; and removing the lubricant from the storage medium after removing the polymer from the land surfaces.

12. The method of claim 11, wherein the lubricant comprises at least one selected from a group consisting of poly(tetrafluoroethylene oxide-co-difluoromethylene oxide) and poly(perfluoropropyl oxide).

13. The method of 11, wherein the removing the lubricant from the storage medium comprises degreasing with at least one selected from a group consisting of 2,3-dihydrodecafluoropentane and ethyl nonafluoroisobutyl ether.

14. The method of claim 1, wherein the removing the polymer from the land surfaces comprises:

selectively removing the polymer such that 1 nm or less of the polymer remains on the land surfaces.

15. The method of claim 1, wherein the storage medium comprises:

a bit-patterned media storage medium comprising land surfaces and recess surfaces.

16. The method of claim 1, wherein the storage medium comprises:

a discrete track media storage medium comprising land surfaces and recess surfaces.

17. A method comprising:

coating a storage medium with a polymer, wherein the storage medium comprises land surfaces comprising a first material and recess surfaces comprising a second material, and the first material and the second material are different; and removing the polymer from the land surfaces to form a substantially planar surface on the storage medium, wherein the polymer comprises a functionalized end group at a first end configured to bond to the recess surfaces.

18. The method of claim 17, further comprising:

applying a lubricant layer on the substantially planar surface of the storage medium, wherein the polymer has a second end configured to bond to the lubricant layer.

* * * * *